(12) United States Patent  
Logue et al.

(10) Patent No.: US 7,533,580 B2  
(45) Date of Patent: *May 19, 2009

(54) CORIOLIS FLOWMETER

(75) Inventors: Paul Logue, Indianapolis, IN (US); Jerry E. Stevens, Brownsburg, IN (US)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/979,984

(22) Filed: Nov. 13, 2007

(65) Prior Publication Data

US 2008/0066521 A1 Mar. 20, 2008

Related U.S. Application Data

(63) Continuation of application No. 10/940,759, filed on Sep. 15, 2004, now Pat. No. 7,302,356.

(51) Int. Cl.  
*G01F 1/84* (2006.01)

(52) U.S. Cl. .................................. 73/861.355

(58) Field of Classification Search ............ 73/861.356, 73/861.355, 861.357  
See application file for complete search history.

(56) References Cited

U.S. PATENT DOCUMENTS

| 4,996,871 | A  | 3/1991 | Romano |
| 5,594,180 | A  | 1/1997 | Carpenter |
| 6,505,519 | B2 | 1/2003 | Henry |
| 6,704,666 | B2 | 3/2004 | Normen |
| 6,754,594 | B2 | 6/2004 | Henry |
| 6,847,901 | B2 | 1/2005 | Suzuki |
| 7,302,356 | B2 * | 11/2007 | Logue et al. ............... 702/100 |
| 2004/0200259 | A1 | 10/2004 | Mattar |
| 2007/0144234 | A1 | 6/2007 | Mattar |

FOREIGN PATENT DOCUMENTS

| EP | 1 1217 976 B1 | 11/2005 |
| WO | WO 2005/031285 A1 | 4/2005 |

* cited by examiner

*Primary Examiner*—Jewel Thompson  
(74) *Attorney, Agent, or Firm*—Bacon & Thomas, PLLC

(57) ABSTRACT

A Coriolis flowmeter having an improved measurement accuracy, especially in measurement applications, where conventional Coriolis flowmeter may have a reduced accuracy due to erroneous flow spiking or outputs during no-flow situations is described, comprising: a measurement tube (4), a driver (16) for imparting a force proportional to an applied excitation signal to the measurement tube (4) for setting the measurement tube (4) into an oscillatory motion, motion sensors (17, 18) for measuring the motion of the measurement tube (4), an excitation signal generator, for generating the excitation signal to be supplied to the driver (16) based on the measurement signals derived by the motion sensors (17, 18), means (20, 27) for monitoring the excitation signal or a damping-coefficient of a damping of the measurement tube (4) and for determining whether an amplitude (A) of the excitation signal or the damping coefficient exceeds an application-specific range, and means for determining a corrected flow ($F_c$) of a fluid through the measurement tube (4), wherein the corrected flow ($F_c$) is determined based on measurement signals derived by the motion sensors (17, 18), when the excitation signal or the damping coefficient has an amplitude, that lies within the application-specific range and wherein the corrected flow ($F_c$) is set to an application-specific flow, when the excitation signal or the damping coefficient has an amplitude, that exceeds the application-specific range.

7 Claims, 4 Drawing Sheets

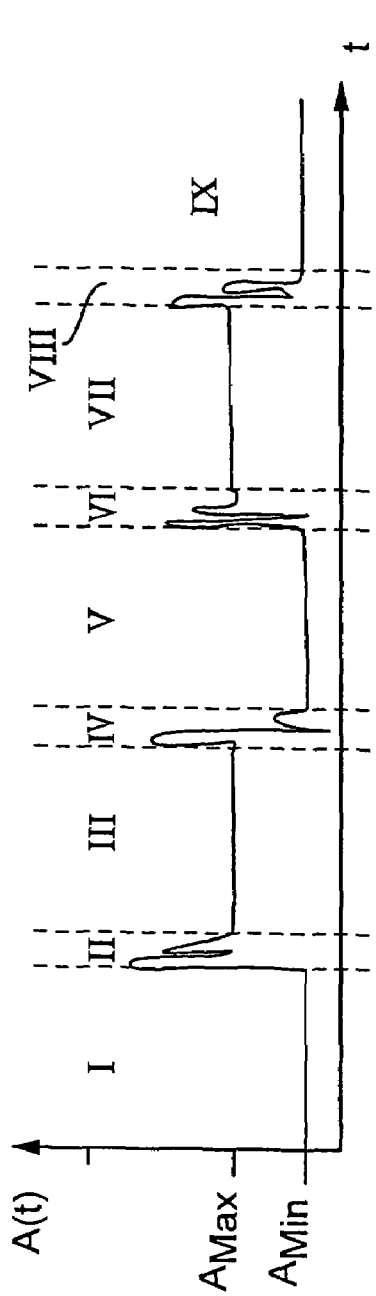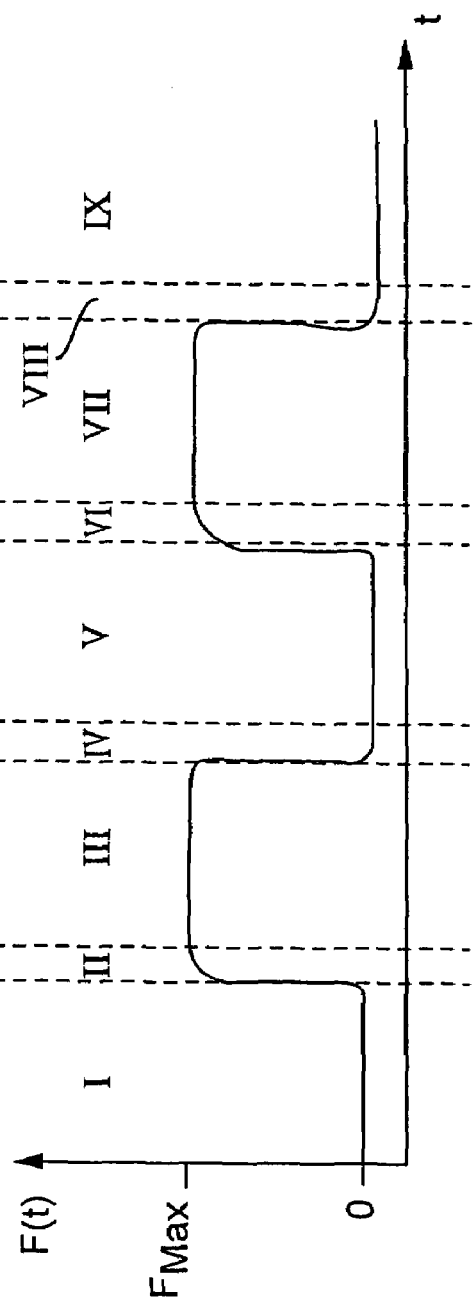

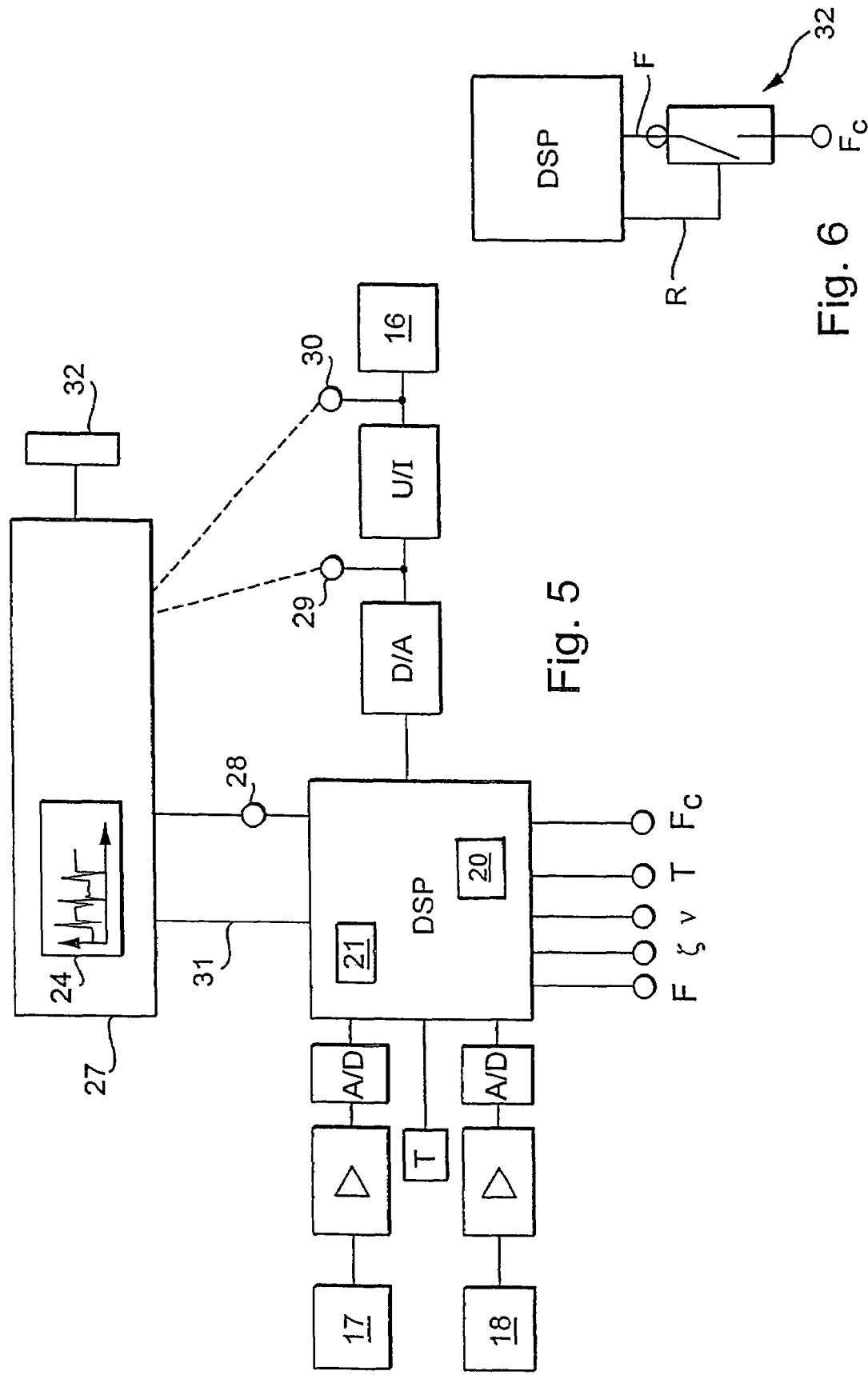

CORIOLIS FLOWMETER

This application is a Continuation of U.S. application Ser. No. 10/940,759 filed on Sep. 15, 2004 now U.S. Pat. No. 7,302,356.

BACKGROUND AND SUMMARY OF THE INVENTION

The present invention relates to a Coriolis flowmeter.

Coriolis flowmeters are commonly used devices for measuring a flow of a fluid through a pipe. In various branches of industry, for example in the chemical industry, in the food industry or in the pharmaceutical industry, the measurement data obtained by Coriolis flowmeters is used to control complex industrial processes.

Coriolis flowmeters operate on the Coriolis Effect. A mass flow dependent Coriolis force occurs when a moving mass is subjected to an oscillation perpendicular to the flow direction. Coriolis flowmeters generally comprise at least one measurement tube and a driver for setting the tube into an oscillatory motion. In operation, the fluid flows through the oscillating tube. One type of driving mechanism is an electromechanical driver that imparts a force proportional to an applied excitation signal, i.e. a current or a voltage. Measurement tube and fluid form an oscillatory system that is normally operated at a resonance frequency. The resonance frequency depends on the material of the measurement tube and a density of the fluid. The Coriolis force is induced by the oscillatory motion. A Coriolis reaction force experienced by the traveling fluid mass is transferred to the measurement tube itself and is manifested In a change of motion of the tube. Two motion sensors detect this change. Mass flow is usually determined based on a phase difference between the measurement signals derived by the motion sensors.

In order to operate the flowmeter in a resonant mode of vibration, most flowmeters comprise a feed back loop generating the excitation signal based on the measurement signals of the motion sensors. Feeding back the sensor signal to the driver permits the drive frequency to migrate to the resonant frequency.

Coriolis flowmeters are used in applications where repeatable and stable measurement of liquid mass or volume flow is required. In applications where successive batches of products are processed conventional flowmeters can suffer from poor meter accuracy and repeatability. The reason for this is that whenever a sudden transition from a full measurement tube to an empty measurement tube or vice versa occurs, the physical properties of the oscillatory system change dramatically and the flow meter needs time to adjust in order to establish a desired mode, frequency and amplitude of the motion for the respective measurement situation. During this transition time, conventional coriolis flow measurement based on the measurement signals derived by the motion sensors do not produce accurate results. Erroneous flow spiking or outputs during no-flow situations are common operational problems.

Currently, mass flow meter manufacturers approach solutions to overcome this problem in four ways:
1) The meter exceeds a manufacturer predefined limit of excitation signal or drive gain and faults, locking the output variables at a fail-safe condition.
2) The meter has two separate drive circuits, evaluates the drive gain from normal conditions, and compensates for this change, while applying a mathematical algorithm adjusting the measured mass flow variable.
3) A density limit is programmed into the meter to account for the detected change in the measured product density, as a means to regulate a fail-safe point.
4) A low flow cut-off is elevated.

Unfortunately, these four methods result in measurement accuracy and performance issues:
A) The predefined fault limit may be significantly higher than the actual process condition which produces an erroneous flow output or the meter output locks up, requiring frequent manual intervention.
B) Process evaluation of two drive circuit gain levels can be falsely interpreted and the resulting measuring uncertainty exceeds 2%.
C) The density limit point or range is slower to react to the change, including reaction to empty measurement tube conditions.
D) Elevation of the low flow cut-off can miss measurable product flow or is ineffective as a recognition technique.

Some of these approaches are for example described in U.S. Pat. No. 6,505,519 B2. In this patent, a self-validating meter is described, which provides a best estimate of a parameter to be measured, e.g. mass flow, based on all information available. This flowmeter comprises a controller, which derives a raw measurement value based on the sensor signals of the motion sensors. When the controller detects no abnormalities, the controller has nominal confidence in the raw measurement value and produces a validated measurement value equal to the raw measurement value. When the controller detects an abnormality in the sensor, it produces a validated measurement value, which is a value that the controller considers to be a better estimate of the parameter to be measured.

It is an object of the invention to provide a Coriolis flowmeter, with improved measurement accuracy, especially in measurement applications, where conventional Coriolis flowmeter may have a reduced accuracy due to erroneous flow spiking or outputs during no-flow situations.

To this end, the invention comprises a Coriolis flowmeter comprising:
   a measurement tube,
   a driver for imparting a force proportional to an applied excitation signal to the measurement tube for setting the measurement tube into an oscillatory motion,
   motion sensors for measuring the motion of the measurement tube,
   an excitation signal generator, for generating the excitation signal to be supplied to the driver based on the measurement signals derived by the motion sensors,
   means for monitoring the excitation signal and for determining whether an amplitude of the excitation signal exceeds an application-specific range, and
   means for determining a corrected flow of the fluid through the measurement tube,
   wherein the corrected flow is determined based on measurement signals derived by the motion sensors, when the excitation signal has an amplitude, that lies within the application-specific range and
   wherein the corrected flow is set to an application-specific flow, when the excitation signal has an amplitude that exceeds the application-specific range.

According to a refinement of the invention, the application-specific range for the amplitude of the excitation signal corresponds to a range for the amplitude that will occur under normal operation conditions of the specific application, wherein a maximal amplitude occurs, when the flow reaches a maximal flow to be expected for the specific application and a minimal amplitude occurs, when the flow is zero.

According to a further refinement, the flowmeter comprises a separate output, solely for providing an output signal representing the corrected flow.

According to another refinement, the flowmeter comprises a relay connected to an output representing the preliminary flow, which will set the output representing the preliminary flow to the application-specific flow, when the excitation signals exceeds the application-specific range.

Further, the invention comprises a method of determining the application-specific range of the amplitude of the excitation signal for a flowmeter according to the invention, including the steps of running one or more test cycles, by sending consecutive batches of product through the flowmeter, monitoring the amplitude of the excitation signal during the test cycles, determining the minimal and the maximal amplitude of the excitation signal during periods of normal operation of the flowmeter during the test cycles, and setting the application-specific range accordingly.

According to a refinement of the method, the maximal amplitude of the excitation signal during normal operating conditions is based on a test cycle run with a product having the highest density and/or highest viscosity of the products to be used in the specific application.

Further, the invention comprises a Coriolis flowmeter comprising:

a measurement tube, a driver for imparting a force proportional to an applied excitation signal to the measurement tube for setting the measurement tube into an oscillatory motion, motion sensors for measuring the motion of the measurement tube, an excitation signal generator, for generating the excitation signal to be supplied to the driver based on the measurement signals derived by the motion sensors, means for deriving and monitoring a damping coefficient of the motion of the measurement tube and for determining whether the damping exceeds an application-specific range, and means for determining a corrected flow of a fluid through the measurement tube, wherein the corrected flow is determined based on measurement signals derived by the motion sensors, when the damping coefficient lies within the application-specific range, and wherein the corrected flow is set to an application-specific flow, when the damping coefficient exceeds the application-specific range.

The invention and further advantages are explained in more detail using the figures of the drawing, in which four exemplary embodiments are shown.

BRIEF DESCRIPTION OF THE DRAWING

FIG. 3 shows an amplitude of an excitation signal, which occurs, when two consecutive individual batches of product are send through the flowmeter;

FIG. 4 shows a flow which occurs, when two consecutive individual batches of product are send through the flowmeter;

FIG. 5 shows a block diagram of a second embodiment of a measurement and control circuit of a Coriolis flowmeter; and FIG. 6 shows a relay connected to an output of the flowmeter representing the measured flow.

DETAILED DESCRIPTION OF THE DRAWINGS

Figure 1:
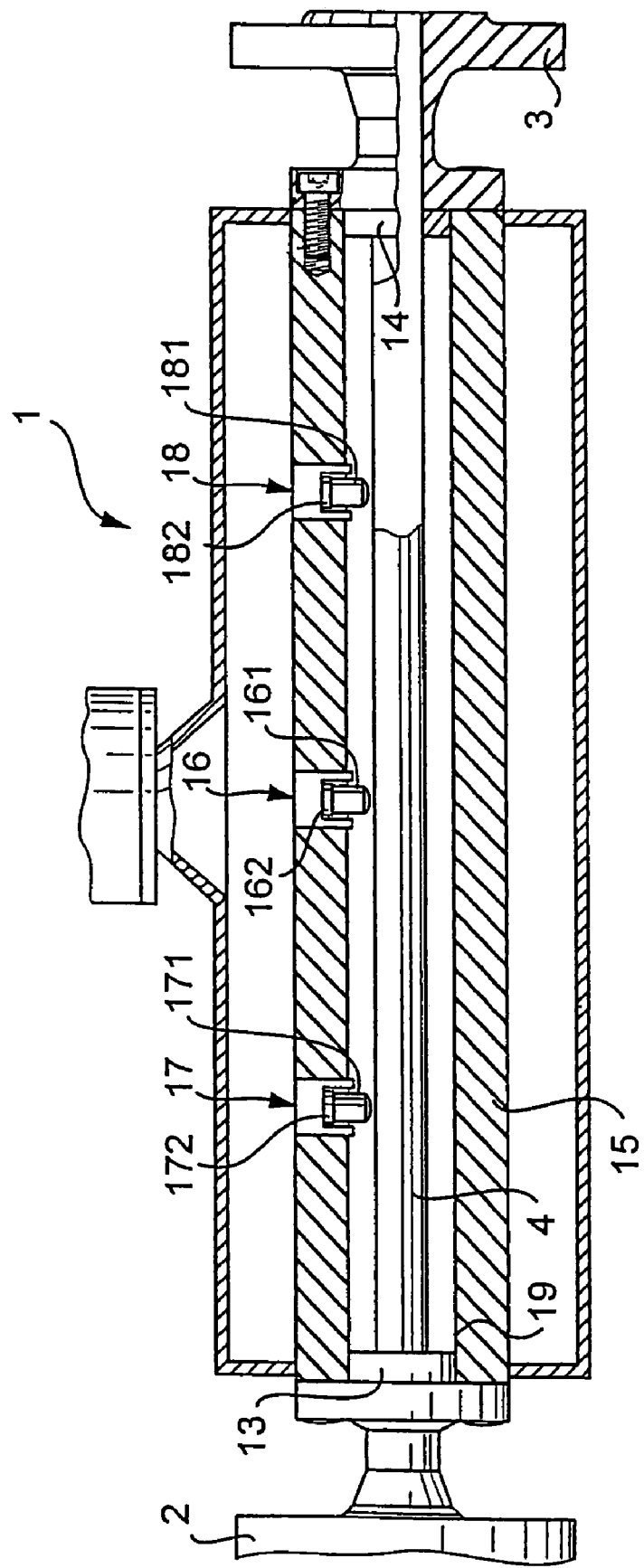
FIG. 1 shows a schematic diagram of a sensor of a Coriolis flowmeter.
Figure 2:
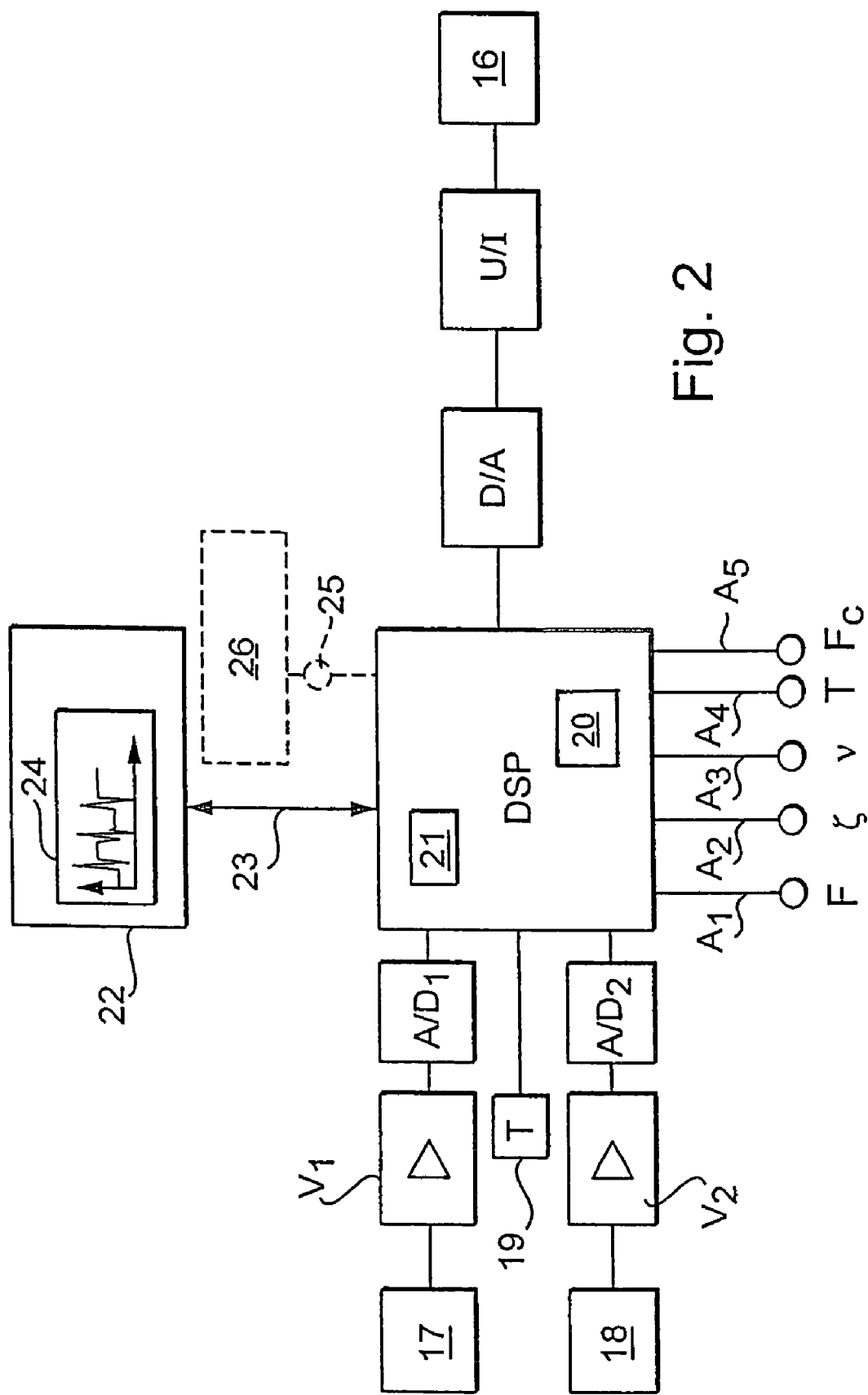
FIG. 2 shows a block diagram of a first embodiment of a measurement and control circuit of a Coriolis flowmeter.

The Coriolis flowmeter according to the invention comprises a sensor 1 and a measurement and control circuit for operating the flowmeter. FIG. 1 shows a schematic diagram of the sensor 1. FIGS. 2 and 5 show embodiments of a measurement and control circuit. The sensor 1 is to be inserted in a pipe, not shown in FIG. 1. A flow of a fluid through the pipe connected to the sensor 1 is to be measured. In operation, the sensor 1 is connected to the pipe via flanges 2, 3. In the embodiment shown, the sensor 1 comprises a single straight measurement tube 4, having an inlet fixed to an endplate 13 near the flange 2 and an outlet connected to an endplate 14 near flange 3.

The invention is not limited to this specific type of sensor. It can also be applied in combination with other types of sensors. Sensors with a single measurement tube and an internal reference mass, as for example described in EP 97 81 00559, sensors with a curved measurement tube, as for example described in EP 96 10 9242, or sensors comprising two parallel straight or curved measurement tubes, as for example describes in U.S. Pat. Nos. 4,793,191 or 4,127,028 can also be used.

The flanges 2, 3 and the endplates 13, 14 are mounted on or inside a supporting tube 15. A driving mechanism is foreseen for setting the measurement tube 4 into an oscillatory motion. In the embodiment shown, the driving mechanism comprises a driver 16, which is mounted in a middle of the tube 4 between the two endplates 13, 14. The driver 16 is for example an electro mechanic transducer comprising a permanent magnet 161 and a coil 162. The coil 162 is mounted on the supporting tube 15 and the permanent magnet 161 is fixed onto the measurement tube 4.

In operation, the driver imparts a force proportional to an applied excitation signal to the measurement tube 4, thus setting the measurement tube 4 into an oscillatory motion.

In the embodiment shown, the excitation signal is supplied to the driver 16 in form of an excitation current through the coil 162. Depending on the type of driver that is used, other forms of excitation signals, for example excitation voltages can be applied. Via the excitation current through the coil 162 amplitude and frequency of a bending vibration of the measurement tube 4 in the projection plane are controlled.

Depending on mass flow Coriolis forces occur in the projection plane, causing a phase shift in the oscillation of the measurement tube 4.

Motion sensors 17, 18 measure a resulting motion of the measurement tube 4. In the embodiment shown, two motion sensors 17, 18 are foreseen. They are mounted on the supporting tube 15 and are positioned symmetrically to both sides of the driver 16. The motion sensors 17, 18 can for example be electro mechanic transducers comprising a permanent magnet 171, 181 inside a coil 172, 182. The permanent magnets 171, 181 are mounted on the measurement tube 4 and the coils 172, 182 are mounted on the supporting tube 15. A motion of the measurement tube 4 causes a corresponding motion of the magnets 171, 181 inside the coils 172, 182, inducing a voltage across the coils 172, 182. The induced voltage forms a measurement signal, which is supplied to a measurement and control circuit. FIG. 2 shows a block diagram of a first embodiment of measurement and control circuit.

Amplifiers V1 and V2 amplify the measurement signals of the motion sensors 17, 18. The amplified signals are digitized by analog to digital converters $A/D_1$ and $A/D_2$ and their respective digital output is supplied to a digital signal-processing unit DSP. Amplitude, frequency and phase of the motion of the measurement tube 4 at the location of the motion sensors 17, 18 are derived and a preliminary flow F through the measurement tube 4 is determined based on this information using known methods of determining flow, for example by determining the phase difference of the measurement signals or a time shift of the measurement signals. An output $A_1$ is foreseen, giving an output signal representing the preliminary flow F.

In addition, one ore more temperature sensors 19 can be foreseen on the measurement tube 4, which are connected to the measurement and control circuit. Based on measurement data received by the temperature sensors 19 and the measurement signals of the motion sensors 17, 18, a density $\rho$ and a viscosity $\nu$ of the fluid can be determined. Outputs $A_2$, $A_3$ and $A_4$ are foreseen, for providing output signals representing density $\rho$, viscosity $\nu$ and temperature T of the fluid.

The Coriolis flowmeter further comprises an excitation signal generator, for generating the excitation signal to be supplied to the driver 16 based on the measurement signals derived by the motion sensors 17, 18.

In the embodiment shown, the digital signal processing unit DSP provides a digital control signal which is transformed into an analog excitation voltage by digital to analog converter D/A. The excitation voltage is supplied to a voltage to current converter U/I, which in turn transforms the excitation voltage into an excitation current, which is supplied to the driver 16.

Various methods of determining the excitation signal are known in the industry. U.S. Pat. No. 6,507,791 and 6,505,519 for example give descriptions of several methods for determining the excitation signal. The excitation signal is determined based on the sensor signals. The excitation signal generator is part of a feed back loop in which the sensor signals or a signal derived based on one or both sensor signals is amplified and fed back to the measurement tube 4 via the driver 16. Feeding back the sensor signal to the driver 16 permits the drive frequency to migrate to the resonant frequency. In some Coriolis flowmeters, a gain is adjusted in order to adjust an amplitude of the oscillation of the measurement tube 4 to a desired value.

One method includes determining a sum of the measurement signals, which is a measure for an amplitude of the oscillation of the measurement tube 4 in the middle of the measurement tube 4 at the location of the driver 16.

Any change in the flow or the physical properties of the fluid flowing through the measurement tube 4 will instantaneously alter the mode of oscillation. The excitation signal adapts immediately to this change in order to maintain the desired resonant mode of vibration.

Under normal operation conditions, Coriolis flowmeters allow a very accurate measurement of the flow. During normal operation conditions, fluid can flow steadily through the flowmeter, it can vary continuously or be zero. In applications, where consecutive batches of products are send through the flowmeter however, conventional flowmeters can suffer from poor meter accuracy and repeatability. The reason for this is, that whenever a sudden transition from a full measurement tube 4 to an empty measurement tube 4 or vice versa occurs, the physical properties of the oscillatory system change dramatically and the flow meter needs time to adjust in order to establish the desired mode, frequency and amplitude of the motion for the respective measurement situation. During this transition time, conventional Coriolis flow measurement based on the measurement signals derived by the motion sensors 17, 18 do not produce accurate results. In particular, positive as well as negative flow spikes may be detected. Some products trap air or gas, which may outgas between batches or at the end of a batch. This can be falsely interpreted as product flowing through the meter.

In order to overcome this problem, the flowmeter according to the invention comprises means for monitoring the excitation signal 20 and for determining whether an amplitude of the excitation signal exceeds an application-specific range. The sudden transition described above is immediately reflected in a sudden change in the excitation signal. FIG. 3 shows an example of an amplitude of the excitation signal, which occurs, when two consecutive separate batches of product flow through the flowmeter. FIG. 4 shows the corresponding flow F. In section I of FIGS. 3 and 4, the measurement tube 4 is empty, mass flow equals zero and the amplitude of the excitation signal shows a minimal value $A_{min}$. In section III of FIGS. 3 and 4, the measurement tube 4 is full of product and the flow has reached a maximum value $F_{max}$. Correspondingly, the amplitude of the excitation signal shows a maximal value $A_{max}$.

Sections I and II correspond to normal operation conditions. In section II a transition from empty to full occurs. The actual flow F shows a quick steady rise. In order to adapt the sudden change, and to establish the desired amplitude and frequency of the motion of the measurement tube 4, the amplitude of the excitation signal rises above its maximal value $A_{max}$. Whilst the amplitudes clearly exceed the maximal value $A_{max}$, which may occur during normal operation, it is usually well below predefined amplitude limits $A_{limit}$, which are reached when the meter stalls, or defects of the sensor occur. To give an example, a nominal value for $A_{min}$ may be 3, a nominal value for $A_{max}$ may be 40 and a nominal value for the predefined amplitude $A_{limit}$ may be 90.

In section V of FIGS. 3 and 4, the measurement tube 4 is empty again, flow F equals zero and the amplitude of the excitation signal shows the minimal value $A_{min}$. In section IV a transition from full to empty occurs. The actual flow F shows a quick steady fall. Again, the system adapts to the sudden change and establishes the desired amplitude and frequency of the motion of the measurement tube 4. During this period, the amplitude of the excitation signal rises above its maximal value $A_{max}$.

The same cycle occurs, when the second batch of product is processed. Correspondingly, sections VI, VII, VIII and IX show the same characteristic features as the corresponding sections II, III, IV and V.

When air or gas is trapped in the products, it can outgas or migrate, especially at the beginning and at the end of each individual batch. This will also cause the excitation signal to rise above its maximal value $A_{max}$.

Reaction times of modern type flowmeters are very short. It usually takes less than 1 or 2 seconds for the system to adapt to these sudden changes. Within this reaction time though, normal flow measurement is not possible. The motion of the measurement tube 4 is disturbed and the measurement signals taken in this time period can result in flow spikes, which give rise to erroneous measurement.

In order to overcome this problem, Coriolis flowmeters according to the invention comprise means 20 for monitoring the excitation signal and for determining whether its amplitude exceeds an application-specific range. In the embodiment shown in FIG. 2, the means 20 for monitoring the excitation signal and for determining whether its amplitude exceeds a predetermined range are incorporated in the digital signal-processing unit DSP providing the digital excitation signal. The amplitude of the digital excitation signal is determined as a function of time and compared to the application-specific range. Based on this comparison time intervals are determined during which normal operation conditions occur and during which the transition occurs. During normal operation conditions the amplitude lies within the application-specific range. During the transition period, the amplitude exceeds the application-specific range.

Further, the flowmeter comprises means for determining a corrected flow $F_c$ of a fluid through the measurement tube 4. In the embodiment shown in FIG. 2 these means include a software module stored in a memory 21, which is run on the digital signal-processing unit DSP. The means for determining a corrected flow $F_c$ determine the corrected flow $F_c$ based on measurement signals derived by the motion sensors 17, 18, during intervals of normal operation, when the excitation signal has an amplitude, that lies within the application-specific range. They set the corrected flow equal to an application-specific flow, for example to zero, during the transition period, when the excitation signal has an amplitude, that exceeds the application-specific range. The application-specific flow is preferably chosen according to failsafe requirements of the specific application under consideration. In the embodiment shown in FIG. 2 a separate output A5 is foreseen, solely for providing an output signal representing the corrected flow $F_c$.

The application-specific range for the amplitude of the excitation signal corresponds to a range for the amplitude that will occur under normal operation conditions. The range can for example be determined experimentally by running one or more test cycles on the application site. During the test cycles, consecutive batches of product are send through the flowmeter. When flow of consecutive batches of different products are to be measured, the range needs to be determined according to the minimal and the maximal amplitude $A_{min}$ and $A_{max}$ of the product with the highest density and/or highest viscosity. The range is determined in a setup procedure performed prior to the beginning of the actual flow measurement. The application-specific range for the amplitude of the excitation signal corresponds to a range for the amplitude that will occur under normal operation conditions of the specific application, wherein a maximal amplitude $A_{max}$ occurs, when the flow reaches a maximal flow to be expected for the specific application and a minimal amplitude $A_{min}$ occurs, when the flow is zero.

There are various ways to determine the application-specific range.

In the embodiment shown in FIG. 2 a field tool 22 is connected to the flowmeter via a communication interface 23. The field tool 22 comprises a display 24. One or more test cycles are run and the flowmeter communicates the amplitude of the excitation signal to the field tool 22, and displays the amplitude as a function of time on the display. Maximal and minimal amplitude $A_{max}$ and $A_{min}$ can be determined visually and a user can set their respective values for the specific application. These customized values are then communicated to the flowmeter and stored.

Alternatively, the flowmeter can comprise an output 25 representing the excitation signal or its amplitude, which can be connected to means 26 for monitoring and/or displaying the excitation signal or its amplitude. These means can for example be programmable logical controllers (PLC) or decentralized control systems (DCS), which can for example be connected to a personal computer, not shown in FIG. 2. The output 25 and the means 26 are shown using dotted lines in FIG. 2.

Instead of a visual determination of the range for the amplitude, algorithms can be used to determine the range based on the measurement data obtained during the test cycles.

This setup procedure allows the user to optimize the range of the amplitude of the excitation signal with respect to the range of products of the specific application in order to obtain exact measurement results during operation.

Alternatively, the means for monitoring the excitation signal 27 can be included in a separate unit, included in the flowmeter, as shown in FIG. 3. The excitation signal can for example be provided to the separate unit in form of the digital excitation signal via a digital output 28 of the digital signal processing unit DSP, or in form of the analog excitation voltage provided by an analog output 29 linked to the digital to analog converter D/A or in form of the analog excitation current provided by an analog output 30 linked to the voltage to current converter U/I.

In the embodiment shown in FIG. 2 the means 20 for monitoring the excitation signal are integrated in the digital signal-processing unit DSP. FIG. 5 shows an alternative embodiment, wherein means the for monitoring the excitation signal 27 are designed as a separate unit. They are connected to the digital output 28 of the digital signal-processing unit DSP representing the excitation signal or its amplitude. Here the means 27 determine whether the amplitude exceeds the application-specific range. A communication line 31 is foreseen for communicating the result of the determination to the digital processing unit DSP, which then determines the corrected flow as described above.

Instead of the digital excitation signal, the excitation voltage or the excitation current or any other form of the excitation signal representing its characteristic features can be supplied to the means 27. This is shown in FIG. 5 by a dotted line connecting an output 29 of the digital to analog converter D/A to the means 27 and by a dotted line connecting an output 30 of the voltage to current converter U/I to the means 27.

The means 27 can be equipped with a display 24 and a communication interface 32 to allow the user to determine and set the application-specific range during the setup procedure. Alternatively, a field tool, a programmable logical controller (PLC) or a decentralized control system (DCS) or other means as described with respect to the embodiment shown in FIG. 2 can by applied during setup procedure.

Whereas the flowmeters shown in FIGS. 2 and 5 have two separate outputs representing the preliminary flow and the corrected flow, it is also possible to provide a flowmeter comprising only one output representing the corrected flow. A preferred embodiment of such a flowmeter comprises a relay R shown in FIG. 6. The relay R relay is connected to an output 32 representing the preliminary flow F. It operates as a switch, which will set the output 32 to a predetermined setting corresponding to the application-specific flow, when the excitation signals exceed the application-specific range. When the excitation signal lies within the application-specific range, relay R is inactive and an output signal of output 32 represents the preliminary flow F.

Experiments have shown, that a damping of the oscillation of the measurement tube 4 is very closely related to the excitation signal. In most cases it is a linear relation. Some flowmeters allow to derive and monitor a damping coefficient. Consequently, flowmeters according to the invention can use the damping coefficient instead of the excitation signal in order to achieve accurate measurement results when consecutive batches of product are send through the flowmeter. Such a Coriolis flowmeter can be designed identical to the flowmeters described above, comprising the measurement tube 4, a driver 16 for imparting a force proportional to an applied excitation signal to the measurement tube 4 for setting the measurement tube 4 into an oscillatory motion, motion sensors 17, 18 for measuring the motion of the measurement tube 4, and an excitation signal generator, for generating the excitation signal to be supplied to the driver 16 based on the measurement signals derived by the motion sensors. The only difference is, that it comprises means for deriving and monitoring a damping coefficient of the motion of the measurement tube 4. These means can be the same as means 20, 27 described above for monitoring the excitation signal. The excitation signal is directly related to the damping, such that the damping coefficient can be determined based on the excitation signal. The flowmeter determines, whether the damping coefficient exceeds an application-specific range. The application-specific range is determined analog to the determination of the application-specific range for the amplitude of the excitation signal. Means are foreseen, for determining a corrected flow $F_c$ of the fluid through the measurement tube 4, wherein the corrected flow $F_c$ is determined based on measurement signals derived by the motion sensors 17, 18 when the damping coefficient lies within the application-specific range and wherein the corrected flow $F_c$ is set to an application-specific flow, when the damping coefficient exceeds the application-specific range.

What is claimed is:

1. A Coriolis flowmeter comprising:
  a measurement tube;
  a driver for imparting a force proportional to an applied excitation signal to said measurement tube for setting said measurement tube into an oscillatory motion;
  motion sensors for measuring the motion of said measurement tube;
  an excitation signal generator, for generating the excitation signal to be supplied to said driver based on the measurement signals derived by said motion sensors,
  means for monitoring the excitation signal and for determining whether an amplitude of the excitation signal exceeds an application-specific range; and
  means for determining a corrected flow of a fluid through said measurement tube, wherein:
  the corrected flow is determined based on measurement signals derived by said motion sensors, when the excitation signal has an amplitude that lies within the application-specific range; and
  the corrected flow is set to an application-specific flow, when the excitation signal has an amplitude, that exceeds the application-specific range.

2. The Coriolis flowmeter according to claim 1, wherein:
  the application-specific range for the amplitude of the excitation signal corresponds to a range for the amplitude that will occur under normal operation conditions of the specific application; and
  a maximal amplitude occurs, when the flow reaches a maximal flow to be expected for the specific application and a minimal amplitude occurs, when the flow is zero.

3. The Coriolis flowmeter according to claim 1, further comprising:
  a separate output, solely for providing an output signal representing the corrected flow.

4. The Coriolis flowmeter according to claim 1, further comprising:
  a relay connected an output representing the preliminary flow, which will set the output representing the preliminary flow to the application-specific flow, when the excitation signals exceeds the application-specific range.

5. A Coriolis flowmeter comprising:
  a measurement tube;
  a driver for imparting a force proportional to an applied excitation signal to said measurement tube for setting said measurement tube into an oscillatory motion;
  motion sensors for measuring the motion of said measurement tube;
  an excitation signal generator, for generating the excitation signal to be supplied to said driver based on the measurement signals derived by said motion sensors,
  means for deriving and monitoring a damping coefficient of the motion of said measurement tube and for determining whether the damping exceeds an application-specific range;
  means for determining a corrected flow of a fluid through said measurement tube, wherein:
  the corrected flow is determined based on measurement signals derived by said motion sensors, when the damping coefficient lies within the application-specific range; and
  the corrected flow is set to an application-specific flow, when the damping coefficient exceeds the application-specific range.

6. A method of determining the application-specific range of the amplitude of the excitation signal of a flowmeter, including the steps of:
  running one or more test cycles, by sending consecutive batches of product through the flowmeter;
  monitoring the amplitude of the excitation signal during the test cycles;
  determining the minimal and the maximal amplitude of the excitation signal during periods of normal operation of the flowmeter during the test cycles; and
  setting the application-specific range accordingly.

7. The method according to claim 6, wherein:
  the maximal amplitude of the excitation signal during normal operating conditions is based on a test cycle run with the product with the highest density and/or highest viscosity to be used in the specific application.

* * * * *